Jan. 7, 1941.　　　　　G. E. GAREY　　　　2,227,641
BASIN FORMING DEVICE
Filed July 7, 1939　　　2 Sheets-Sheet 1
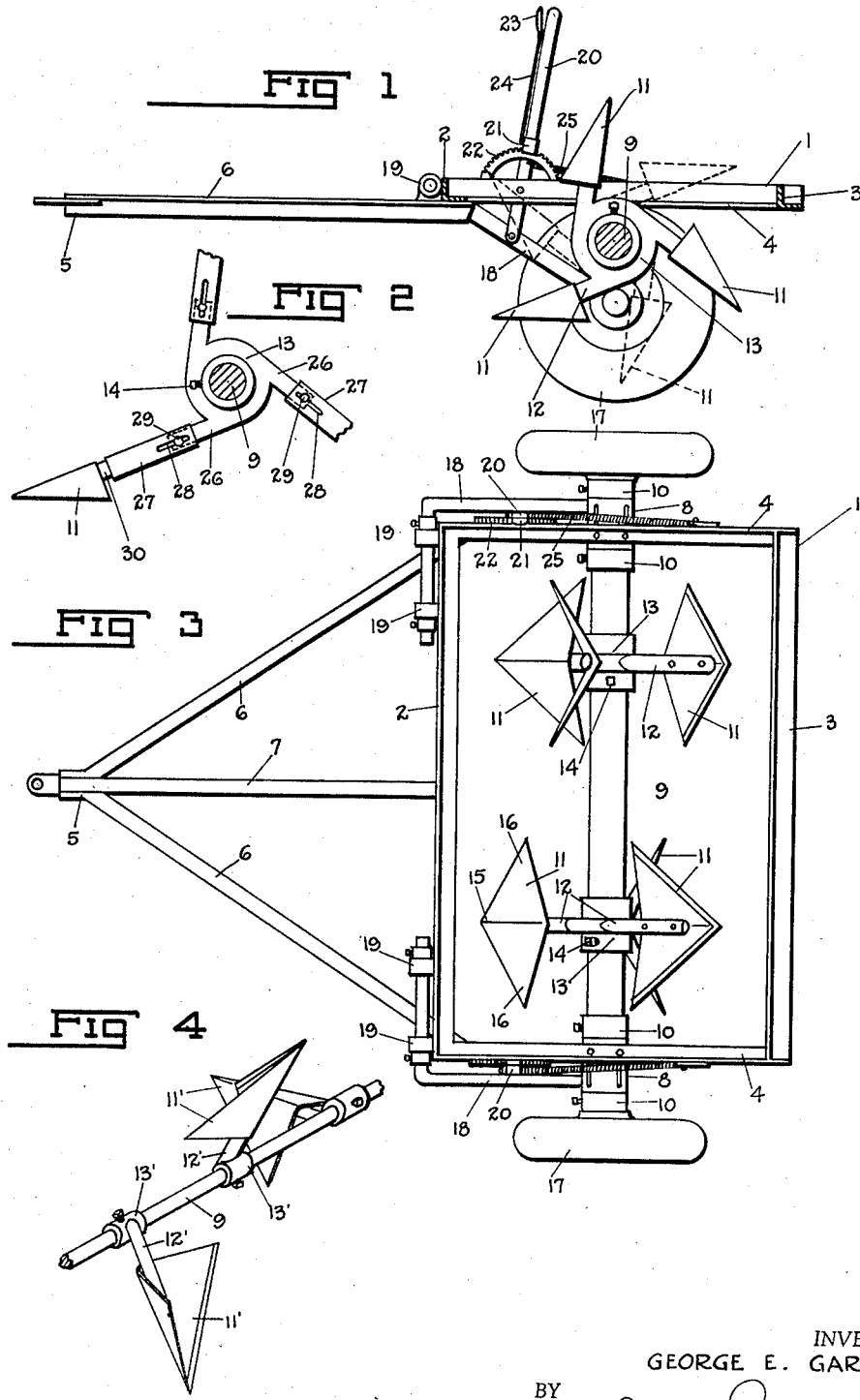
INVENTOR.
GEORGE E. GAREY
BY Charles R. Werner
ATTORNEY.

Jan. 7, 1941. G. E. GAREY 2,227,641
BASIN FORMING DEVICE
Filed July 7, 1939 2 Sheets-Sheet 2
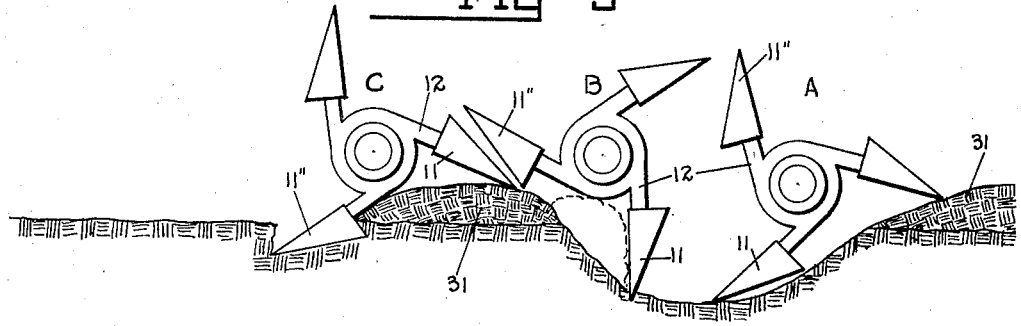
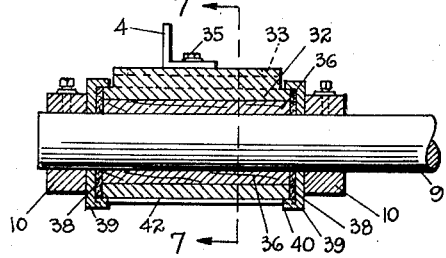
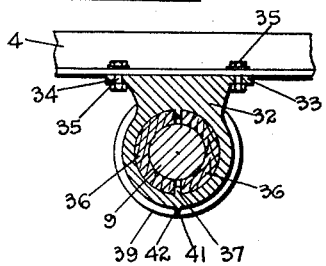
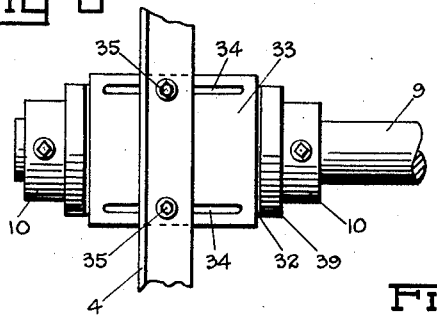
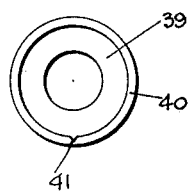
INVENTOR.
GEORGE E. GAREY
BY Charles R Werner
ATTORNEY.

Patented Jan. 7, 1941

2,227,641

UNITED STATES PATENT OFFICE 2,227,641

BASIN FORMING DEVICE

George E. Garey, Downs, Kans.

Application July 7, 1939, Serial No. 283,250

9 Claims. (Cl. 97—52)

This invention relates in general to an agricultural implement and particularly to a pocket or basin forming device which may be drawn along the ground behind a plow or the like, or independently behind a tractor.

Water and wind erosion of the soil has greatly depleted the fertility of much farm and pasture land, and in combatting this destructive property of the elements various means and systems have been employed in the formation of trenches, depressions, basins, pockets or other similar moisture traps in the surface of the land. Provision of such pockets has not only prevented serious erosion but has aided in materially increasing the crop yield on cultivated lands.

Toward this end I have provided a basin forming device having a plurality of spades arranged about a shaft, the spades being so formed and arranged that they will rotate and perform their basin digging operation without any mechanical blade rotating means, that is, the action of one blade will force another blade into basin excavating position.

In the formation of pockets or basins, it is most desirable that the walls of said pockets be of substantially equal height so that the pocket can retain the maximum amount of moisture. There is no object in creating high sides and leaving the front and rear of the pocket low, or in throwing up a high dam at the front and rear of the pocket and leaving the sides low, since after the pocket has been filled with moisture, the overflow will commence at the lowest wall.

For that reason I have so designed my basin forming device that it will throw soil to each side of the basin as well as at the ends thereof and an equi-height wall will be formed about the basin.

The objects of my invention are: first; to provide a basin forming device in which the spades will rotate by their action on the soil.

Second; to provide a device which will form basins having substantially equal height walls.

Third; to provide a basin forming device in which the spade arm may be adjusted for length to regulate the spacing of the basins.

Fourth; to provide a novel bearing construction peculiarly adapted for use on rotating shafts employed in basin forming and similar devices.

Further objects, advantages and the construction and operation of my invention will be clearly understood by reference to the following specifications in connection with the accompanying drawings in which:

Fig. 1 is a vertical side view of my invention, showing one form thereof, parts being shown in section.

Fig. 2 is a fragmentary, side view of a modified form of spade assembly in which provision is made for longitudinal adjustment of the arms supporting the spades.

Fig. 3 is a top plan view of the device shown in Fig. 1.

Fig. 4 is a fragmentary view of a modified form of spade assembly.

Fig. 5 is a semi-diagrammatic view of a section of terrain showing the spade assemblies in various basin excavating positions.

Fig. 6 is a longitudinal vertical cross sectional view through a bearing forming a part of my invention.

Fig. 7 is a transverse, vertical cross sectional view on the line 7—7 of Fig. 6.

Fig. 8 is a top plan view of the bearing and a fragmentary portion of the frame to which it is adjustably secured.

Fig. 9 is a detail elevational view of one of the end retainers for the bearing.

Referring now to the drawings by numerals of reference I designates a frame having front and rear members 2 and 3 and side members 4. A suitable drawbar 5 may be formed of members 6 and 7. Bearings 8 are carired by the side frame members 4 and rotatably support shaft 9, collars 10 preventing sidewise movement of the shaft.

The spades 11 are carried on arms 12 radiating tangentially from hub 13 which may be secured to the shaft 9 by set screws 14 or any other suitable means. The spades are substantially apiculate or triangular in shape with a sharp leading portion 15 and side flaring portions 16 which are inclined slightly rearwardly from the center of the spade.

The frame 1 may be carried on wheels 17 rotatably mounted on legs 18 pivoted in bearings 19 and adapted to be raised or lowered by lever 20 pivoted to side members 4 of frame 1 and adapted to be retained in adjusted position by dog or retainer 21 receivable in notched arc 22. A hand grip 23 and link 24 may be provided for manipulating the dog, and a spring 25 normally urges lever 20 and consequently the wheels 17 into frame raising position. Although wheels are shown it is obvious that a skid or any other suitable means may be provided for permitting free movement of the device when desired, or to permit up and down adjustment of the device.

In Fig. 2 is shown a modification of my invention in which the hub 13 has radiating stubs 26 on which may be slidably mounted arms 27, a slot 28 being provided therein, through which may pass the fastening means 29. The arm 27 may be secured to the spade 11 or to another stub shaft 30 on said spade. The purpose of providing adjustable arms will be hereinafter set forth.

In Fig. 4 is shown another modification of my invention, relative to the positioning of the spades 11 on the shaft 9. In this design, each hub 13' carries a single arm 12' and spade 11'. The hubs are carried by the shaft and may be adjusted longitudinally as well as about the longitudinal axis of the shaft. The spades are staggered as shown and any number or position of spades may be used.

In Fig. 5 is shown, in semi-diagrammatic form, the action my invention takes in its basin forming operation. It must first be made clear that it is primarily the weight of the device which governs the excavating action of the spades. After a spade has started its downward movement (Fig. 5A) it will continue at that angle until the back pressure of the soil has overcome the weight of the machine at which time the spades will begin to rotate, most of the soil being thrown to the sides as the spade moves through it, but a portion of the soil being carried ahead and deposited by the spade in front thereof as the spade leaves the basin (see Fig. 5B). At this time the next spade (numbered 11'' for clarity) is riding along the surface of the soil and as spade 11 rides the mound 31 it forces the point of spade 11'' into the soil as shown in Fig. 5C, continuing to force it downwardly until the blade 11 has reached the crest of the mound 31. At that time further downward movement of the spade is dependent on the weight and pull of the device.

The action of the device as shown in Fig. 5 is the same for both modifications illustrated in Fig. 1 and Fig. 4, except that the device shown in Fig. 4 will form basins farther apart. The modification shown in Fig. 2 is designed for regulating the spacing of the basins formed by the spades, lengthening or shortening of the spade carrying arms providing for a longer or shorter distance between basins.

The bearing used with my device is illustrated as comprising a bearing housing 32 having a mounting plate or flange 33 integral therewith. Slots 34 are provided in the flange 33 and fastening means 35 pass through the slots 34 and side members 4 of the frame to securely hold the bearing to the frame. Bearing segments 36 are adapted to be mounted in the housing 32 and are kept from rotating by ribs 37. The segments 36 may be of any suitable material but I have found that a hard wood provides a most suitable bearing for my purpose. Lubricant retaining felts 38 are provided at each end of the bearing, the felts also serving to prevent dust from entering the bearing. A felt retaining ring 39 having inturned flange 40 covers the felt and is held in felt retaining position by collars 10. To prevent them from turning with the shaft, the retaining rings 39 are provided with a notch 41 adapted to engage rib 42 on the bearing housing 32.

From the foregoing it will be apparent that I have provided a simple basin forming device adapted to be manufactured and sold at a relatively low cost, said device being capable of forming spaced basins with sides of substantially equal height, the spacing and excavating of the basins being controlled by the inherent design of the basin forming spades and not by any mechanically driven means. I have also provided a device in which the spade assemblies are easily adjustable longitudinally on the shaft as well as about the longitudinal axis of the shaft.

It will also be apparent that I have provided a novel bearing structure in which the wearing parts are very inexpensive and may be readily replaced when worn beyond further use. The bearing is easily adjusted on the frame and capable of supporting a heavy load with a minimum amount of wear.

It will be obvious that many changes in form, proportion and details of construction may be resorted to without departing from the spirit of my invention and I reserve all rights to such changes and equivalents which come under the scope of the specification and the following claims.

What I claim as new and desire to secure by Letters Patent is:

1. In a device of the class described, a frame, a plurality of basin forming spades rotatably mounted on the frame, each of said spades being adapted to dig a basin and deposit soil at the sides and the forward end of the basin, the spades being so constructed and arranged as to force the next spade into basin forming position when the preceding spade rides the soil it has deposited at the forward end of the basin.

2. In a device of the class described, a frame, a plurality of apiculate basin forming spades rotatably mounted on the frame, each of said spades being adapted to dig a basin and deposit soil at the sides and the forward end of the basin, the spades being so constructed and arranged as to force the apex of the next spade into basin forming position when the preceding spade rides the soil it has deposited at the forward end of the basin.

3. In a device of the class described, a frame, rotatable basin forming means comprising a shaft mounted on the frame, basin forming members mounted on the shaft, each member including a hub, one or more arms radiating from the hub, and apiculate spades carried by the arms, said spades being so constructed and arranged as to cause one spade to force another spade into basin forming position, said spade carrying arms being longitudinally adjustable whereby the length of and distance between the basins may be varied.

4. In a device of the class described, a frame, a rotatable basin forming member comprising a shaft, a plurality of arms radiating from the shaft, the arms being spaced longitudinally on the shaft from each other and staggered about the longitudinal axis of said shaft, a spade carried by each arm, said spades being so constructed and arranged as to cause one spade to force another spade into basin forming position.

5. In a device of the class described, a frame, a rotatable basin forming member comprising a shaft, a plurality of individual spades carried by the shaft, each spade being spaced longitudinally on the shaft and staggered about the longitudinal axis of said shaft, said spades being so constructed and arranged as to cause one spade to force another spade into basin forming position.

6. In a device of the class described, a frame, a rotatable basin forming member comprising a shaft, a plurality of individual, apiculate spades carried by the shaft, each spade being spaced longitudinally on the shaft and staggered about the longitudinal axis of said shaft, said spades being so constructed and arranged as to cause one spade to force the apex of another spade into basin forming position.

7. In a device of the class described, a frame, a plurality of apiculate basin forming spades rotatably mounted on the frame, each spade having side portions flaring outwardly from the apex, said spades being so arranged as to cause one spade to force the apex of another spade into basin forming position.

8. In a device of the class described, a frame, a plurality of apiculate basin forming spades rotatably mounted on the frame, each spade having side portions flaring outwardly from the apex, said side portions being bent rearwardly from a center line passing through the apex, said spades being so arranged as to cause one spade to force the apex of another spade into basin forming position.

9. In a device of the class described, a frame, rotatable basin forming means comprising a shaft mounted on the frame, basin forming members mounted on the shaft, each member comprising a hub, one or more arms radiating from the hub, apiculate spades carried by the arms, each spade having side portions flaring outwardly from the apex and rearwardly from the longitudinal axis of the arm, said spades being so arranged as to cause one spade to force another spade into basin forming position.

GEORGE E. GAREY.